United States Patent Office 3,515,508
Patented June 2, 1970

---

3,515,508
SYNTHESIS OF SINGLE CRYSTALS OF ZrSiO$_4$ AND HfSiO$_4$ BY A HALOGEN TRANSPORT REACTION
Fritz Hulliger, Zurich, Switzerland, assignor to American Cyanamid Company, Stamford, Conn., a corporation of Maine
No Drawing. Filed May 6, 1968, Ser. No. 727,056
Int. Cl. C01b *33/20*
U.S. Cl. 23—21                                  6 Claims

---

ABSTRACT OF THE DISCLOSURE

Well-shaped single crystals of tetragonal zirconium and hafnium silicates, ZrSiO$_4$ and HfSiO$_4$, are prepared by the halogen vapor transport technique. Metallic zirconium or hafnium and SiO$_2$ are heated at the hot end in a vapor transport system with about $10^{-5}$–$10^{-4}$ gram equivalents/cm.$^3$ of halogen gas X added in elemental form or as zirconium tetrahalide, ZrX$_4$ or HfX$_4$, respectively, in which X is chlorine, bromine or iodine, the hot end of the transport zone being maintained at a temperature between 1150° and 1250° C., with the cool end of the zone at 1050° to 1150° C. The SiO$_2$ may be present in the form of powder or wool, or may be derived from the walls of an uncoated quartz tube if the latter is used as the container during the process. Where separate SiO$_2$ is introduced, the surface of the tube can be of some other material, such as for example a coating of silicon carbide. The presence of small amounts of antimony, arsenic or phosphorus, of the order of about $\frac{1}{10}$ as much as the zirconium or hafnium metal, seems to speed up the transport process.

---

The single crystals are transparent and are sometimes colored if there are impurities of other transition elements, rare earth elements or uranium. Somewhat larger crystals are obtained when the SiO$_2$ is derived from the wall of an uncoated quartz tube. Normally operation is in a closed tube or container, although an open tube system may also be used. Antimony may be incorporated too, replacing Si, producing a brownish or almost black metallic tint.

BACKGROUND OF THE INVENTION

There has been a need for single crystals of zirconium or hafnium silicate which are transparent and of fair size. This has not been feasible in the processes used hitherto.

SUMMARY OF THE INVENTION

The present invention produces well-shaped transparent single crystals of zirconium silicate or hafnium silicate by the halogen vapor transport technique from the corresponding metals with or without small amounts of antimony, phosphorus or arsenic, for example amounts of about $\frac{1}{10}$ of the other reacting ingredients. The group V elements, or their halides, reduce quartz at reaction temperature and provide additional oxygen. The SiO$_2$, which is in an amount about twice that of the metal, can either be present in the halogen vapor transport zone by the addition of powder or wool, or if a quartz tube is used as the vessel in which halogen vapor transport is effected, the SiO$_2$ may be derived from the walls of the quartz tube, which eventually wears out.

The halogens which are useful are chlorine, bromine and iodine.

The halogen vapor, in concentrations from about $10^{-5}$–$10^{-4}$ gram equivalents/cm.$^3$, may be added as tetrahalides of the metals, or the halogen may be added as a gas. The given range of halogen concentrations corresponds to 0.35–3.5 mg. chlorine/cm.$^3$. Iodine and bromine are easily added as elements while chlorine is preferably introduced as ZrCl$_4$ or HfCl$_4$.

The vessel in which the halogen vapor transport takes place need not be a quartz tube or have an inner surface of SiO$_2$. On the contrary, if desired it may be of some other inert material, for example of carbon, boron nitride, and the like. If the inner surface of the tube does not have exposed SiO$_2$, of course the requisite amounts of SiO$_2$ must be derived from added material in the form of a powder, wool, and the like. It is noteworthy that no crystals formed when the starting material consisted of a stoichiometric mixture of ZrO$_2$ and SiO$_2$ powder.

The temperatures in the various zones of the halogen vapor transport are not sharply critical, and in general temperatures for the hot zone of from 1150° to 1250° C. are suitable, with the cooler zone about 1050° to 1150° C.

The single crystals are transparent and may be colored; for example in the case of zirconium silicate some of the crystals nearer the metal may have a brownish tinge. Colors can also be obtained by the deliberate addition of small amounts of other transition elements, replacing zirconium an hafnium atoms. The well formed single crystals and their transparency lend themselves to the manufacture of synthetic semi-precious stones and other uses.

Other colors can be produced by traces of rare earth elements or uranium instead of the transition elements, and a certain range of colors is made possible so that semi-precious stones of many colors are readily available.

The size of the single crystals produced varies. In general the largest and most perfect crystals are obtained when uncoated quartz tubes are used for the vapor transport conveyor with no added SiO$_2$ powder or wool. This procedure, therefore, is preferred. The reason for the variation in crystal size and perfection of mineralization has not been completely determined, and it is not desired to limit the present invention to any theoretical mechanism. It is possible that the more gradual release of SiO$_2$ from a quartz tube may be a factor. It has also been found by experience that increasing the dimensions of the transport tube facilitates the production of larger crystals.

As the crystal formation is quite slow, a not unusual occurrence in halogen vapor transport systems, it is normally preferred to use closed tubes. However, the invention is not limited thereto and is can also be employed in an open system with the necessary precautions to maintain the desired concentration of gaseous components and the temperatures.

DESCRIPTION OF THE PREFERRED EMBODIMENTS

The invention will be described in greater detail in conjunction with the following specific examples, in which the parts are by weight unless otherwise specified.

EXAMPLE 1

1 to 2 grams of zirconium powder were introduced into an uncoated, closed quartz tube of 25 mm. internal diameter and 200 mm. length, 1.5 to 2 mm. wall thickness. Sufficient bromine to give a concentration of about 4 mg./cm.$^3$ was introduced, the tube sealed, and one end heated to 1150°–1200° C. while the other end was maintained at 1050°–1150° C. A gradual transport resulted with formation of single crystals of zirconium silicate up to 2 mm. in size in the cooler part of the tube. The reaction was quite slow, taking a number of days. The single crystals which were furthest away from the hot end of the tube were glass clear, whereas those nearer the hot end had a slight brownish tinge. After the single crystal formation was complete, the tube was cooled down, opened and the single crystals recovered.

EXAMPLE 2

The procedure of Example 1 was repeated but with 0.2 gm. of antimony added. The single crystals obtained were of excellent shape larger in size (up to 3 mm.) and showed the same degree of high transparency as the products of Example 1.

EXAMPLE 3

The procedure of Example 2 was repeated with antimony replaced by arsenic and bromine replaced by 5 mg./cm.$^3$ iodine. The single crystals obtained were similar to those of Example 1.

EXAMPLE 4

The procedure of Example 2 was repeated using a quartz tube coated with a film of carbon and 2 gm. of powdered $SiO_2$ introduced into the hot end before sealing. The single crystals obtained were well mineralized but not quite as large as in Examples 1 and 2.

EXAMPLE 5

The procedure of Example 1 was repeated replacing the zirconium with a stoichiometrically equivalent amount of hafnium. Clear, transparent, well-formed, single crystals were obtained though of smaller size than in Example 1.

EXAMPLE 6

The procedure of Example 2 was repeated replacing the zirconium with a stoichiometrically equivalent amount of hafnium. The single crystals obtained were substantially the same as in Example 5.

EXAMPLE 7

The procedure of Example 4 was repeated replacing the zirconium with a stoichiometrically equivalent amount of hafnium. The single crystals produced were well-formed and transparent, but as in the case of Example 4, their size averaged somewhat less than in the preceding two examples.

I claim:

1. A process of preparing single crystals of silicates of metals selected from the group consisting of zirconium and hafnium, in which the metal and an equivalent amount of $SiO_2$ are heated in a halogen vapor transport vessel in the presence of a halogen selected from the group consisting of chlorine, bromine and iodine in a concentration of $10^{-5}$–$10^{-4}$ gram equivalents/cm.$^3$, the starting material at one end of the vessel being maintained at a temperature of 1150° to 1250° C. and the other end 50 to 100° C. lower, the conditions of vapor transport being maintained until formation of single crystals of the silicates is substantially complete and recovering the single crystals thus formed.

2. A process according to claim 1 in which the metal is zirconium.

3. A process according to claim 1 in which the metal is hafnium.

4. A process according to claim 1 in which the vapor transport is effected in an uncoated quartz tube.

5. A process according to claim 4 in which an amount of an element selected from the group consisting of antimony, arsenic and phosphorus of the order of about $\frac{1}{10}$ the amount of the metal is present in the hot end of the transport zone.

6. A process according to claim 1 in which an amount of an element selected from the group consisting of antimony, arsenic and phosphorus of the order of about $\frac{1}{10}$ the amount of the metal is present in the hot end of the transport zone.

References Cited

UNITED STATES PATENTS 1,816,006  7/1931  Easter _____ 23—24

FOREIGN PATENTS 450,053  7/1936  Great Britain.

OTHER REFERENCES

"Encyclopedia of Chemical Reactions" by C. A. Jacobson, vol. 8, 1959 ed., p. 241. Reinhold Publishing Corp., New York.

"Chemical Transport Reactions" by H. Schafer, 1964 ed., pp. 8–10, 14, 16 and 37. Academic Press, New York and London.

EDWARD STERN, Primary Examiner

U.S. Cl. X.R.

23—110; 106—42